Patented Nov. 16, 1948

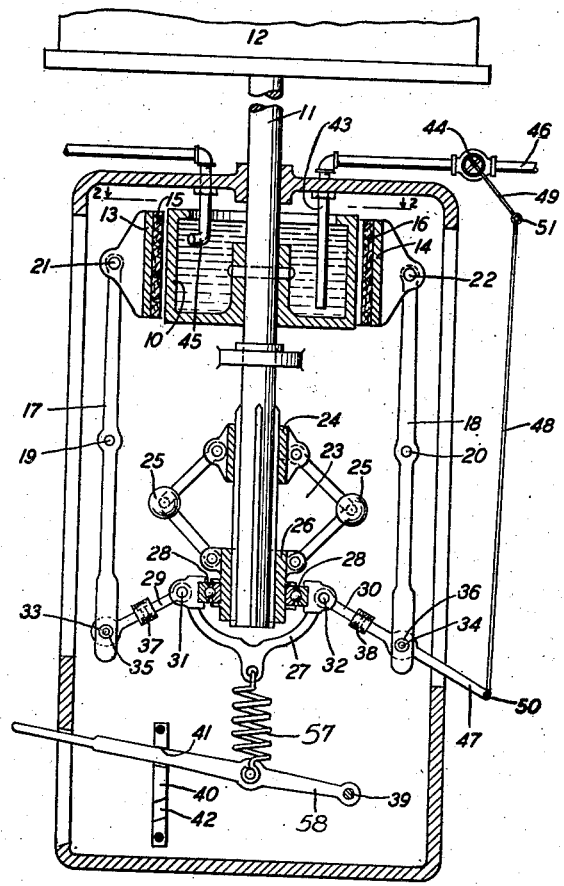

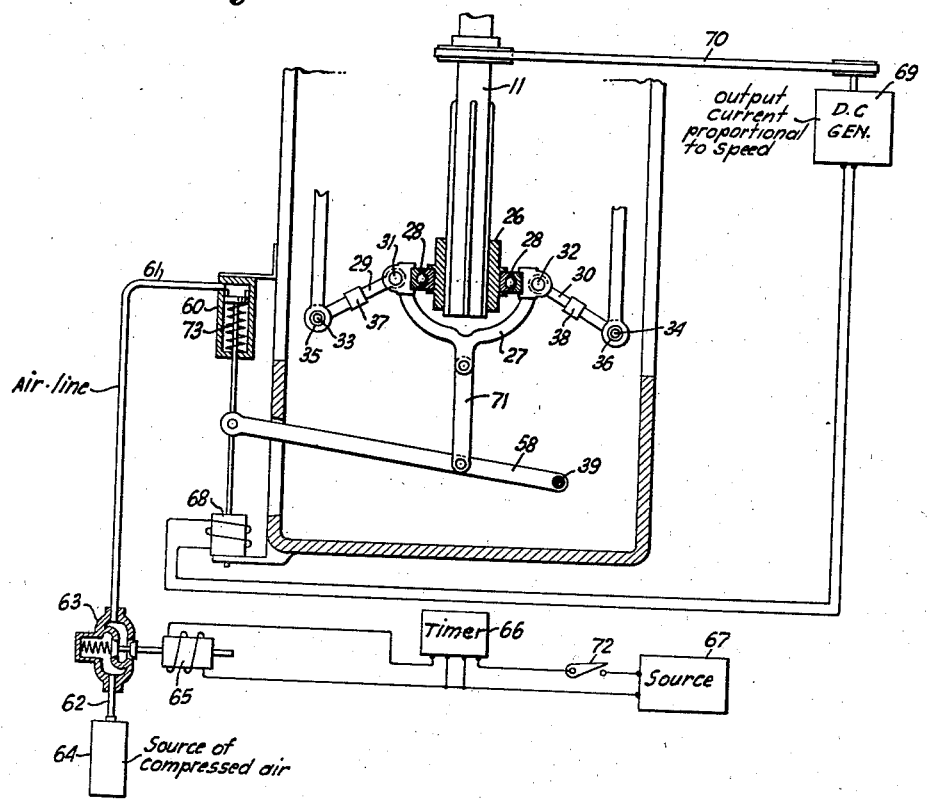

2,453,854

UNITED STATES PATENT OFFICE 2,453,854

SPEED RESPONSIVE BRAKE FOR DECELERATION OF CENTRIFUGAL MACHINES

Charles A. Olcott, West Milford, N. J.

Application May 8, 1942, Serial No. 442,156

4 Claims. (Cl. 188—186)

This invention relates to brakes and more specifically to improved apparatus for applying braking pressure to a rotating drum.

The problem of maintaining brake drums and brake linings in centrifugals used in sugar refining has always been a serious one, and this problem has become more difficult to solve with the recent increase in centrifugal speed in modern machines of this character from about 1200 R. P. M. to about 1800 R. P. M. In the normal operation of a centrifugal, it is desired to reduce the speed from its high speed running value (a few percent less than the 1200 R. P. M. or 1800 R. P. M. "synchronous" speed due to the slip of the induction motor) to a complete stop in a very few seconds with minimum wear and tear on the brake drums and linings, and to repeat this braking process many times in a day.

It is an object of this invention to provide improved means for braking rotating machinery and for performing this operation with minimum wear and tear on the brake drums and brake linings.

It is another object of this invention to provide novel braking means for high speed centrifugals, as, for example, those used in sugar refining.

When the 1800 R. P. M. centrifugals were first put into use, it was customary to use braking apparatus similar to that used in the 1200 R. P. M. machines. Due to the fact that a centrifugal running at about 1800 R. P. M. has two and one-quarter times as much kinetic energy which must be turned into heat at the brake as there is in a centrifugal running at about 1200 R. P. M., it was appreciated that additional cooling means would be required to take care of this extra amount of heat. For this reason water cooled brakes, consisting of hollow brake drums through which water was circulated, were adopted. Heat caused by the braking was developed at the outer surface of each drum and found its way by conduction through the metal of the drum to the water inside and thus the average temperature of the drum was kept low. Unfortunately this did not solve the problem because heat was developed on the outer surface of the drum at a rate sufficiently rapid to cause this surface to attain a very high temperature. The great difference between this high outside temperature and the relatively low temperature on the inside tended to cause cracking of the brake drum, even when the very best materials for the purpose were utilized. When a brake is properly designed for operation around 1200 R. P. M. the braking surface is such that the number of B. t. u.'s developed per square inch of surface is not enough to cause cracking of the drum and this condition was approximated in the machines operating at that speed. When the speed was increased to 1800 R. P. M., the rate of heat generated per second per square inch naturally increased substantially. Of course this excessive rate of heat generation was in effect only during the operation of the braking period when the machine was being reduced from 1800 to 1200 R. P. M. At speeds below 1200 R. P. M. the rate at which heat developed was the same as with the older machines.

It was discovered that loosening the brake reduced the rate of heat generation, and thus eliminated cracking of the drums and burning of the linings. This increased the time required to stop the machine, so that the cycle of operation was prolonged and the output of the centrifugal reduced. With the older machines, it was possible to bring them to a stop from a speed of about 1200 R. P. M. in 12 seconds. The same brake will stop an 1800 R. P. M. machine in 18 seconds if not loosened. The practice of loosening the brake resulted in a period of deceleration extending up to 2 minutes (depending on how much the brake was loosened). This lengthened period of deceleration is a disadvantage.

It is a further object of this invention to greatly alleviate the above-mentioned difficulties and to provide a brake with a pressure which varies with time.

The foregoing and other objects are attained in accordance with the present invention wherein there is provided a brake with a pressure which gradually increases as the machine decelerates so that the amount of energy removed, and therefore the amount of heat generated by the braking, is substantially constant over a very large portion of the entire period of deceleration. The energy removed, being proportional to the product of the speed times the pressure, is therefore substantially constant over the range desired. An ideal condition would be one in which the product of the pressure times the speed would be constant throughout the entire period of deceleration, but this would mean practically infinite pressure when the machine was about to stop. As a practical matter, therefore, this condition is maintained only down to a speed of about 450 R. P. M.

In accordance with a preferred embodiment of the invention, shown by way of example to illustrate the principles of novelty thereof, there is provided a rotating machine (such as a centrifugal for separating sugar from sugar bearing materials) having a shaft or similar rotating member carrying a brake drum within which water is adapted to circulate and around which are one or more brake bands adapted to be applied to the drum at a pressure which varies in accordance with the speed of the decelerating member. While it is clear that various means may be employed to so vary the brake pressure, as a specific example there is provided a governor rotated in accordance with the speed of the rotating member of the centrifugal. This governor is positioned in such a way that as the rotating portion decelerates, the pressure of braking is increased so that for a major portion of the deceleration period, the product of brake pressure and speed is a constant.

Various other ways of gradually increasing the braking pressure with time are possible and some of these ways are described below. It is obvious that while in the preferred embodiment and in certain modifications thereof the means for gradually increasing the braking effect is responsive to the speed of the decelerating shaft, in other embodiments or modifications a similar result is obtained by applying the brake gradually by means independent of the decelerating shaft. For example, a timing apparatus for gradually increasing the brake pressure can be used.

The invention will be more readily understood by referring to the following description, taken in connection with the accompanying drawing forming a part thereof, in which:

Fig. 1 is an elevation view, partially in cross-section, of a centrifugal machine and an arrangement for varying the pressure of braking the machine during the deceleration thereof;

Fig. 2 is a fragmentary plan view showing the brake drum and band;

Fig. 3 is a graphical representation to aid in the description of the invention;

Fig. 4 is a schematic and diagrammatic view of a modified form of the invention;

Fig. 5 is a schematic view of a second modification; and

Fig. 6 is a schematic view of a third modification.

Referring more specifically to the drawings, Fig. 1 shows, by way of example, a water cooled braking mechanism the braking pressure of which is controlled in accordance with this invention. The mechanism includes a brake drum 10 rigidly mounted on a rotating shaft 11 which is adapted to be rotated with a centrifugal machine 12 which is schematically indicated in the drawing, and means, to be described below, for applying a variable pressure to this drum as the speed of the machine is varied. The machine 12 may be placed either above or below the brake drum 10 but has been shown above it in the drawing. The shaft 11 may be the main shaft about which the centrifugal machine is rotated or it may be another shaft adapted to rotate with the main shaft. Outside the brake drum 10 are arranged brake shoes 13 and 14 carrying brake bands or linings 15 and 16 which are applied to the drum 10 when it is desired to brake the centrifugal machine. The brake bands are caused to be applied by the movement of operating levers 17 and 18 which are pivoted at points 19 and 20, respectively. The levers 17 and 18 are pivotally connected to the brake shoes 13 and 14 respectively, by means of pins 21 and 22. The shoes 13 and 14 are anchored at one end thereof by means of pins 23 and 24 fixed in position. Thus a movement of the lower ends of the levers 17 and 18 outwardly causes a corresponding inward movement of the brake shoes 13 and 14, thereby moving the brake linings toward the drum 10 and increasing the braking pressure when the brakes are applied.

The outward movement of the lower ends of the operating levers 17 and 18 is controlled by the speed of the rotating shaft through any suitable means such as, for example, a flyball governor 23 comprising a sleeve 24 which is keyed or otherwise rigidly fixed to the shaft 11 and to which are attached conventional governor weights 25 which are in turn connected to a sliding sleeve 26. The sleeve 26 is splined to the shaft 11 so that while it rotates with the shaft it is free to slide up and down thereon. If desired, the position of the sleeve 24 may be made adjustable so that the force imposed by the governor may be varied. The sleeve 26 is connected to a yoke 27 through the ball-bearing 28 so that the yoke and the sleeve 26 will slide back and forth together.

The movement of the yoke 27 causes push-rods 29 and 30 to move also. These rods are connected to the yoke 27 by means of pins 31 and 32, respectively, and to the levers 17 and 18 by means of pins 33 and 34, respectively. These latter pins are caused to move in apertures 35 and 36 in the respective levers 17 and 18. The push-rods are each provided with means for adjusting their length to compensate for wear of brake lining. Adjusting screws 37 and 38 are provided for the purpose. An upward movement of the yoke 27 pulls the lower ends of the levers 17 and 18 toward the center thus decreasing the brake pressure while a downward movement of the yoke 27 (as when the machine is decelerating) produces an outward movement of the lower ends of the levers 17 and 18 and a consequent increase in braking pressure.

The yoke 27 is attached by means of a spring 57 to an operating lever 58 pivoted around pin 39. The lever 58 is adapted to slide along a guide bar 40 which has notches 41 and 42 therein. It is apparent from the drawing that moving the lever 58 from notch 41 to notch 42 puts the spring 57 under tension and tends to pull the yoke 27 downward, thus causing the brake linings to bear against the brake drum 10 and applying a braking force to the drum.

While the braking arrangement described above may be used with air cooled brakes, it has been shown in the drawing in connection with water cooled brakes. In the arrangement of Fig. 1 water is applied to the inside of the drum 10 by means of a pipe 43 connected to a supply system (not shown) through a suitable valve 44. All except a predetermined amount of the water is removed from the drum 10 by a scoop pipe 45 in a manner well understood in the art. Spilling the water as a result of stopping the drum may be avoided by shutting off the valve 44 in the pipe line 46. This may be accomplished by providing a lever 47 which is an extension of the rod 30 and which actuates rods 48 and 49 to shut off the supply of water when the brake is applied. Rod 48 is pivoted at point 50 to rod 47 and at point 51 to rod 49. Alternatively, the supply may be allowed to continue and the scoop pipe 45 put under a partial vacuum acting to remove the water from the drum, even while the drum is at rest. Another method is to provide the drum 10 with a suitable drainage arrangement (not shown) which permits the water to flow away from it in a manner to prevent its falling to any place where its presence is objectionable.

Before explaining the operation of the arrangement shown in Fig. 1, reference will first be made to the graphical representation shown in Fig. 3 which shows friction in arbitrary units (braking pressure) plotted against speed in R. P. M. The theory of the brake of this invention will be better understood by reference to this figure. The amount of energy removed from a decelerating mass is equal to the decelerating force (that is, friction) multiplied by the linear distance over which the force is applied. If, in accordance with this invention, the machine is to decelerate on the basis of uniform absorption of kinetic energy, the product of the speed times the force must remain constant. Speed and force both being variable, the equation $F \times S = A$ becomes a hyperbola when plotted, as shown in Fig. 3. A complete mathematical curve would start with an infinite speed at which the friction is zero, and pass through all speeds down to zero with increasing friction, until at zero speed the friction is infinite. Obviously in a centrifugal machine, there cannot be an infinite speed nor can a brake be made which produces infinite pressure. Accordingly, as a practical matter, the machine is adapted to operate over the portion of the curve over the cross-hatched portion of Fig. 3. It can be said, by way of example, that the relation shown by the curve exists between a line B—B representing a speed of about 1800 R. P. M. for the centrifugal and the line A—A representing the maximum available braking friction (at 400 R. P. M., more or less). It follows that the area cross-hatched equals the total energy removed by the brake from the centrifugal machine. At any given speed during the deceleration, the friction has a certain definite value which must be located on the hyperbola. The curve in the lower left hand quadrant of Fig. 3 is the other half of the complete hyperbola. The lower curve merely represents the condition in which the centrifugal is revolving in a direction reverse of normal, in other words running backwards. In this latter case, in order to stop the machine, the friction drag must be in the direction opposite to normal, and thus minus values are obtained for both speed and friction. The product of two minus factors is a plus result, which means that a plus amount of energy is removed by the brake regardless of whether the centrifugal is running in the normal direction or running backwards. In accordance with this invention, a brake is provided in which the values of friction follow the hyperbola so as to give the desired absorption of kinetic energy at a uniform rate per second.

The arrangement shown in Fig. 1 operates as follows: Assume that the centrifugal has been loaded with a mother liquor containing sugar, has been brought up to speed and has been operating at this speed (around 1800 R. P. M., for example) for a period of time sufficient to separate the sugar from the liquor. During this period water flows into the drum 10 through the pipe 43 and the excess is removed by the scoop pipe 45. The machine is now ready for braking. The handle of the lever 58 is then moved downward so that the lever is shifted from notch 41 of the member 49 to the notch 42 therein. This puts the spring 57 under tension and pulls down the yoke 27, thereby moving down the pins 31 and 32 and thrusting outwardly the pins 33 and 34. This moves inwardly the pins 21 and 22 and causes the brake bands 15 and 16 to be applied to the drum 10. It is apparent that when the shaft 11 is rotating at high speed, the action of the governor 23 is such as to create a force tending to raise the yoke 27 and to oppose the force imposed by the tension of the spring 57. Thus when the shaft is rotating at high speed and the lever 58 is moved to the notch 42, the spring 57 will tend to apply the brake and the governor 23 will tend to release the brake. The governor 23 and the spring 57 are adjusted to have such a relation with respect to each other that when the lever 58 is moved to the notch 42, the force of the spring will be slightly greater than that of the governor, and thus the brake shoes will be applied to the drum relatively lightly. This light application, however, will be sufficient to cause deceleration of the drum 10 and of the shaft 11. As the shaft 11 decelerates, the force imposed by the governor opposing that of the spring becomes less and the net result is that the pressure of the brakes against the drum increases as the speed of the drum decreases. Under these conditions it is obvious that the braking pressure continuously increases as the speed of the drum decreases. Inasmuch as the heat generated is proportional to the product of the pressure times the speed, the increase in pressure and the decrease in speed tend to keep the heat generated uniform. An ideal condition would be one in which the product of the pressure and the speed is constant throughout the entire period of deceleration, but as pointed out above in connection with Fig. 3 such a condition is impossible to realize in practice. As a practical matter the relation cannot be maintained much below 450 R. P. M. At 450 R. P. M. one would expect to apply four times as much pressure as at 1800 R. P. M. Actually, an allowance must be made for the fact that when 450 R. P. M. is reached, the brake drum has accumulated a considerable amount of heat, to which the heat generated at the slow speed is added, so that, in practice, the pressure applied at 450 R. P. M. is about three times that applied at 1800 R. P. M. After the machine has come to rest, the sugar is removed and the apparatus conditioned for another cycle of operation.

Various modifications are obviously possible. For example, other means interlocking the operation of the brakes and the valve 44 may be used to replace the levers 47, 48 and 49. While a hand operated lever 58 has been shown for convenience in description, it is obvious that a time controlled, automatically operating lever or similar arrangement may be used instead. In many installations it may be preferable to use a pneumatic cylinder, a solenoid or other electromagnetic device to replace both the lever 58 and the spring 57. The method of applying the brake shoes here shown and described is merely to illustrate the principle of the invention, it being understood that conventional brake operated mechanism of any type may be used. Any type of governor may be used, including an electrical one, i. e. one in which the rotation of the shaft operates an electrical generator, creating a current which diminishes as the speed of the shaft diminishes, and this current being used to operate the means used to oppose the application of the brake. Fig. 4 is a schematic and diagrammatic showing of an arrangement embodying certain of the above-mentioned modifications. In the arrangement of Fig. 4, the lever 58 is driven downwardly, thus applying the brake shoes 13 and 14 to the brake drum 10 as in the arrangement of Fig. 1, by pneumatic means, such as, for example, air pressure applied to the cylinder 60 by means of pipe 61. The pipe 61 is connected to the air-pressure source 64 by means of the pipe 62 and a three-way valve 63 which, in its normal position, is opened so as to vent pressure from the cylinder 60 to the atmosphere but which closes the vent when the valve is operated to supply pressure to the cylinder. The operation of the valve is controlled by a solenoid 65 which is, in turn, controlled by timer 66 which is connected to a source of electrical energy 67. Any suitable timer can be employed, such as, for example, that used as the timer T—1 in the arrangement disclosed in Patent 2,148,320 issued February 21, 1939 to Charles A. Olcott. Opposing the downward motion of the piston in the cylinder 60 is a solenoid 68 the coil of which is energized by current from a direct current generator 69 which is driven from the shaft 11 by any suitable means, such as by the belt 70. The generator 69 is of the well-known type which produces an output current proportional to its driven speed. Hence, the flyball governor 23 or the spring 57 of Fig. 1 are not required as the solenoid 68 exerts a force opposing that of the air cylinder 60 which is large at high speeds of the shaft 11 and which decreases as the centrifugal slows down. The yoke 27 is connected to the lever 58 by means of a link 71. Inasmuch as the force of the air cylinder remains constant, the decrease in the opposing force of the solenoid results in an increase in the pressure applied to the brake shoes. The time of application of the brake is determined by the time of application of current to the timer 66 by means of switch 72. When the timer is deenergized, the solenoid is deenergized, shutting off the air pressure and venting the air cylinder 60, in which condition the spring 73 inside the cylinder 60 operates to raise lever 58, thus releasing the brake.

It is obvious that the result desired of gradually increasing the braking effect can be obtained by applying the brake gradually by means independent of the speed of the decelerating shaft. For example, in the arrangement of Fig. 5, the lever 58, instead of being pulled quickly from notch 41 to notch 42, can be moved slowly by means of a slow speed mechanism, such as a gear motor 80. By way of example, a rack 81 connected to the lever 58 can be operated by a pinion 82 which in turn is driven at a slow speed by the gear motor 80. The rack 81 is arranged to trip a switch 83 when it reaches the lowermost position, which switch after a suitable delay to permit the machine to come to a full stop, reverses the direction of rotation of the motor and moves the rack to the upper position, thus releasing the brake. A limit switch 84 operated by the rack going to the upper position disconnects the motor and leaves the apparatus in position for restarting by manually closing the switch which energizes the motor. In order to simplify the drawing, the electric circuits controlled by the operation of the switches 83 and 84 have not been shown. The rate of movement is adjusted in accordance with the braking requirements, that is, if in the particular machine, deceleration from the high speed to the low speed at which the maximum pressure is applied is to take 30 seconds, then the slow speed motor is arranged to move the lever 58 from the notch 41 to the notch 42 in 30 seconds. Of course, with such an arrangement, the governor and its attachments are not needed. In centrifugal machines, particularly those used for drying sugar, every effort is made to maintain the braking period constant. It is for this reason that a timing apparatus for gradually increasing the brake pressure has the same effect as the apparatus responsive to the speed of the shaft.

While a friction brake system has been shown, it is obvious that an electrical brake system can be used instead, that is, one of the type in which the rotating mass is decelerated by causing it to generate a current by means of which the kinetic energy is transformed into heat in a resistance. An arrangement of this kind is shown in Fig. 6. In this figure, the shaft 11 is shown belted to a generator 90 which dissipates its energy into a load 91, thus providing a dynamic brake. The dynamic brake can be so arranged that the current generated is uniform at all speeds, as in automobile generators. As the rate of energy dissipation is proportional to the square of the current, if the current is constant, so will be the rate of energy dissipation. Thus there is no danger of burning out the resistance or the generator coils and the rate of energy loss is constant. This same principle may be utilized in other structures as well.

Various other modifications may be made in the embodiments disclosed without departing from the spirit of the invention, the scope of which is indicated by the appended claims. It will be apparent that in each embodiment the fundamental principle of operation is that the decelerating force increases generally in proportion to the decrease in speed.

What is claimed is:

1. The combination with a heavy centrifugal machine of great inertia and of the type which is adapted for operation on frequently repeated cycles during each of which it is run at high speed for a portion of the cycle free from application of braking force thereto and is then quickly decelerated to rest, of braking means, including a rotating portion attached to and rotating with the centrifugal machine at all speeds, for quickly decelerating said machine when it is desired to bring it to rest, control means for placing said braking means in a released position or in a position at which braking force is applied while said machine is rotating, and means, responsive to the speed of the centrifugal machine and effective only while said control means is in its brake applying position, for controling said braking means so that the braking effect is inversely proportional to the speed of the machine throughout at least one third of the braking period and is independent of the speed of the machine at the time the braking means is applied.

2. The combination of elements as in claim 1 in which said braking means is of the friction type including a brake band adapted to press against a brake drum forming a part of said rotating portion.

3. The combination of elements as in claim 1 in which said braking means is of the friction type including a brake band adapted to press against a brake drum forming a part of said rotating portion and in which said last-mentioned braking controlling means includes a centrifugal governor of the mechanical type positioned to rotate with said rotating portion.

4. The combination of elements as in claim 1 in which said control means includes pneumatic means for applying said braking means and said last-mentioned means includes an electrical generator the output current of which is proportional to the speed of said rotating portion and means controlled by said output current for varying the effect of said braking means.

CHARLES A. OLCOTT.

REFERENCES CITED

The following references are of record in the file of this patent:

UNITED STATES PATENTS

| Number | Name | Date |
|---|---|---|
| 678,352 | See | July 9, 1901 |
| 865,732 | Vandernell et al. | Sept. 10, 1907 |
| 1,139,566 | Ogburn | May 18, 1915 |
| 1,248,439 | Batchelder | Dec. 4, 1917 |
| 1,390,597 | Westinghouse | Sept. 13, 1921 |
| 1,733,898 | Moore | Oct. 29, 1929 |
| 2,040,464 | Cameron et al. | May 12, 1936 |
| 2,090,460 | Schaum | Aug. 17, 1937 |
| 2,096,341 | Roberts | Oct. 19, 1937 |
| 2,130,864 | Steps | Sept. 20, 1938 |

FOREIGN PATENTS

| Number | Country | Date |
|---|---|---|
| 608,477 | Germany | Jan. 24, 1935 |